US005851332A

United States Patent [19]

Kerr, Jr.

[11] Patent Number: 5,851,332

[45] Date of Patent: Dec. 22, 1998

[54] SELF ADHESIVE LABEL APPLICATOR TOOL AND METHOD OF APPLYING

[76] Inventor: Frederick Aaron Kerr, Jr., 1804 "D" Ave., Lawton, Okla. 73501

[21] Appl. No.: 968,715

[22] Filed: Nov. 12, 1997

Related U.S. Application Data

[63] Continuation-in-part of Ser. No. 670,571, Jun. 26, 1996.

[51] Int. Cl.[6] .............................. B44C 1/00; B32B 31/00

[52] U.S. Cl. .......................... 156/238; 156/240; 156/247; 156/541; 156/579

[58] Field of Search .................................... 156/579, 230, 156/238, 240, 247, 541, 540, 542, 556

*Primary Examiner*—David A. Simmons
*Assistant Examiner*—Linda L. Gray

[57] ABSTRACT

A sticker applicator and a method of applying stickers to an article using the sticker applicator. The sticker applicator is a plate bent to form an angle across a portion thereof and a ring portion attached to the top surface of the plate through which a finger is placed for use. The applicator is placed on a finger such that the finger is through the ring portion and rests on the top surface. The nail portion faces away from the top surface. A supply of stickers supported on a tape is placed over an edge portion of the plate such that a first portion of the tape lies across the bottom surface and a second portion of the tape lies across the top surface. The tape is pulled over the edge portion using the second portion such that a lead sticker separates from the tape above the edge portion. Pressure is applied to a back portion of the lead sticker to adhere the lead sticker to the article.

2 Claims, 2 Drawing Sheets

SELF ADHESIVE LABEL APPLICATOR TOOL AND METHOD OF APPLYING

CROSS-REFERENCE TO RELATED APPLICATIONS

This application is a continuation-in-part of application Ser. No. 08/670,571 filed Jun. 26, 1996.

BACKGROUND OF INVENTION

Field of the Invention

This invention relates to a simple apparatus for application, by hand, of a self adhesive promotional sticker to a product for adding information about the product.

SUMMARY OF THE INVENTION

The invention disclosed herein comprises a hand applicator by means of which self adhesive promotional stickers can be applied to products by retail merchants or wholesale sales representatives for the aid in resale of the products. Special self adhesive promotional stickers are available in a large variety of colors, sizes, and shapes, which not only catch the eye of a prospective customer, but also inform, at a glance, the special price that is to be paid for such products.

In the retail business, it is common knowledge that these self adhesive promotional stickers assist in the sale of an item more so than without. In most cases, an item that is being promoted is usually in great quantity. Therefore, the time invested in actually placing the self adhesive promotional stickers on by hand, one by one, is too time consuming to be cost effective. The self adhesive sticker applicator tool, according to the present invention, aids the wholesaler/retailer in meeting the need for a quick efficient way to separate the self adhesive stickers from a backing and apply the self adhesive stickers to items for resale, in a very time productive manner, which in turn, will generate greater sales.

BRIEF DESCRIPTION OF THE DRAWINGS

The invention is described hereinafter in greater detail by reference to the drawings in which.

DETAILED DESCRIPTION OF THE INVENTION AND PREFERRED EMBODIMENTS

Figure 1:
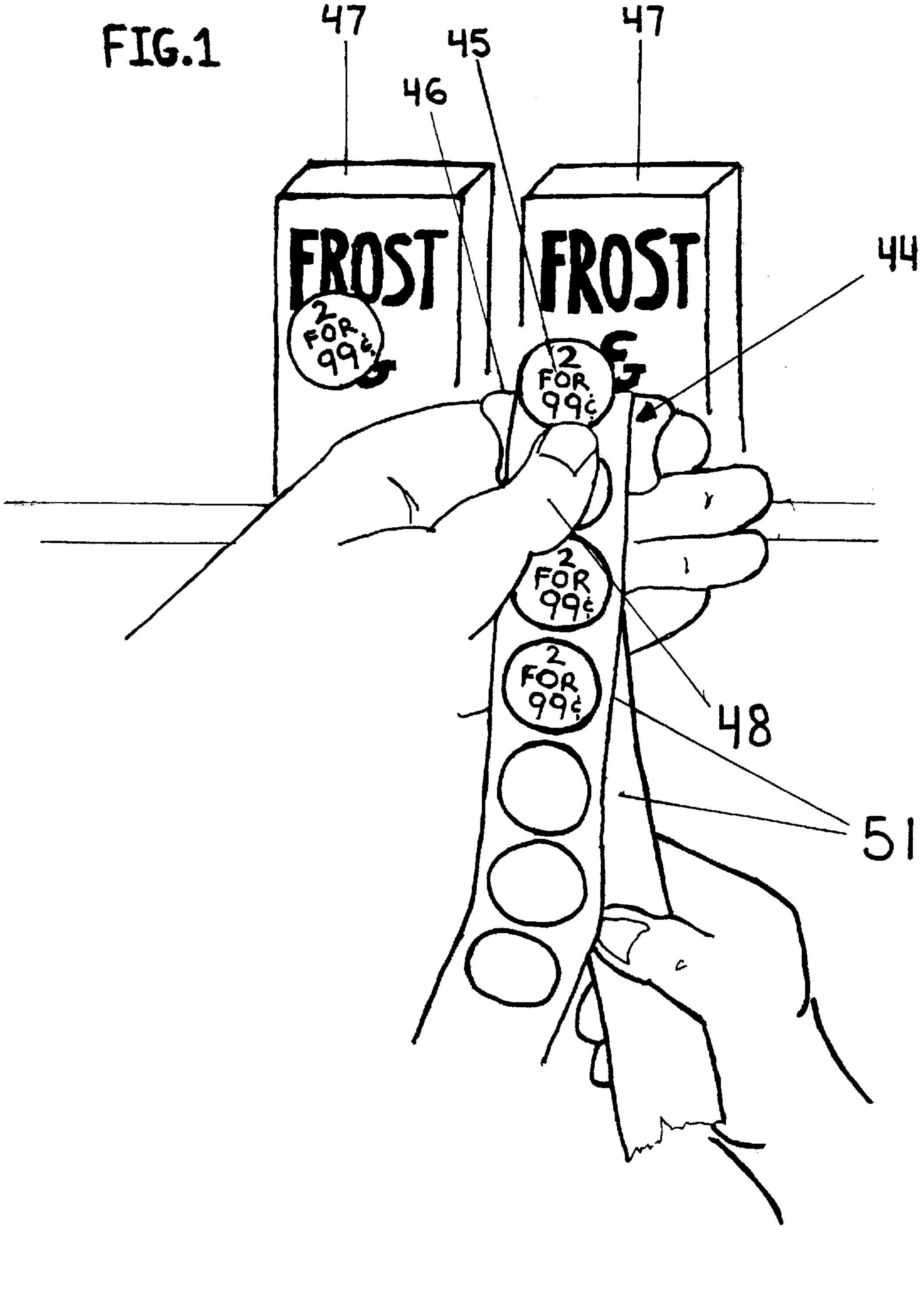
FIG. 1 displays the actual position of the applicator during operation.

Turning now to the drawings there is shown in FIG. 1 an applicator 44, in accordance with the invention, for application of a self adhesive sticker 45 to a product 47 by pulling a sticker tape 51, supporting the sticker 45, over a straight edge 46 of the applicator 44 and then attaching the sticker 45 to the product 47 by simultaneously pressing a thumb 48 onto the back of the sticker 45 and applying pressure to the sticker 45 to assure adhesion of the sticker 45 to the product 47.

Figure 2:
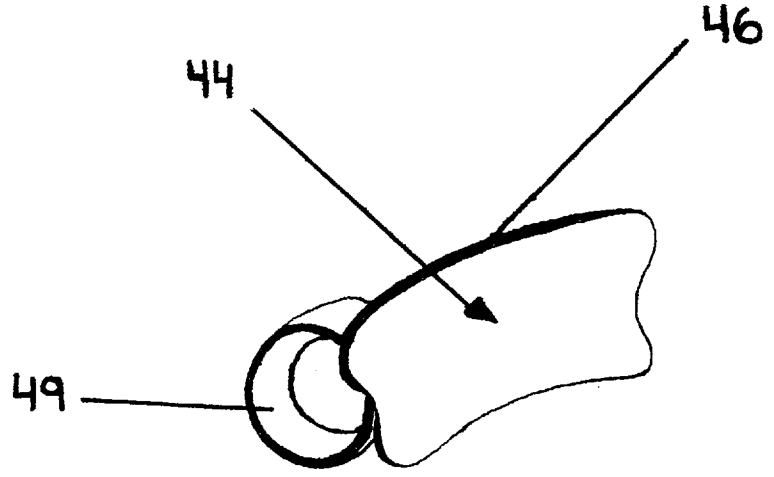
FIG. 2 is a view of the applicator when not fitted for operation.

The applicator 44 is provided with a ring fitting 49, shown in FIG. 2, which is adjustable to fit any finger. The fitting 49 gives a user stability during operation.

The applicator 44 is in the form of a plate, having a top surface and a bottom surface, which is bent at a 170° angle just in front of the fitting 49 which forms the plate into two plate subportions. The fitting 49 is provided on the top surface of one of the two plate subportions.

During use, the applicator 44 is placed on a finger such that the finger is through the fitting 49, and the finger rests on the top surface of the plate where the nail portion of the finger faces away from the top surface. When the tape 51 is pulled over the edge 46 of the applicator 44, the sticker 45 separates itself from the tape 51, instead of following the path of the tape 51 being pulled over the edge 46, to be attached by pressure from the thumb 48 to the product 47. Specifically, the tape 51 is placed over the edge 46 such that a first portion of the tape 51 lies across the bottom surface of the plate and a second portion of tape 51 lies across the top surface of the plate. The sticker 45 separates above the edge 46, as shown in FIG. 1.

The applicator 44 can be made from any of various materials such as polyvinyl chloride, polyamides, polyethylene, and metal. When made of plastic, the applicator 44 may be injection molded or fabricated out of a larger piece of plastic.

The size of the of applicator 44 and the fitting 49 are determined by the average index finger length. Specifically, the length of the applicator 44 is approximately 1 inch wide and 1.75 inches long.

What is claimed:

1. A sticker applicator comprising a plate having a top surface and a bottom surface where the plate is bent to form an angle across a portion thereof to form two plate subportions, and a ring portion attached to the top surface of one of the two plate subportions.

2. A method for applying a sticker to an article comprising:

providing a sticker applicator comprising a plate having a top surface and a bottom surface where the plate is bent to form an angle across a portion thereof to form two plate subportions, and a ring portion attached to the top surface of one of the two plate subportions;

placing the sticker applicator on a finger such that the finger is through the ring portion and rests on the top surface where the nail portion of the finger faces away from the top surface;

providing a supply of self adhesive stickers supported on a tape;

placing the tape over an edge portion of the plate such that a first portion of the tape lies across the bottom surface and a second portion of the tape lies across the top surface;

pulling the tape over the edge portion using the second portion such that a lead sticker separates from the tape above the edge portion;

applying pressure to a back portion of the lead sticker and pressing the lead sticker onto the article to adhere the lead sticker to the article.

* * * * *